United States Patent
Hossain et al.

(10) Patent No.: US 11,768,379 B2
(45) Date of Patent: Sep. 26, 2023

(54) ELECTRONIC DEVICE WITH FACIAL SENSORS

(71) Applicant: Apple Inc., Cupertino, CA (US)

(72) Inventors: Muhammad F. Hossain, Sunnyvale, CA (US); Samuel A. Resnick, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/147,147

(22) Filed: Jan. 12, 2021

(65) Prior Publication Data

US 2021/0294104 A1    Sep. 23, 2021

Related U.S. Application Data

(60) Provisional application No. 62/990,792, filed on Mar. 17, 2020.

(51) Int. Cl.
*G02B 27/01* (2006.01)
*G06F 3/01* (2006.01)
*G06V 40/16* (2022.01)

(52) U.S. Cl.
CPC .......... *G02B 27/0172* (2013.01); *G06F 3/011* (2013.01); *G06V 40/166* (2022.01); *G06V 40/172* (2022.01); *G02B 2027/0138* (2013.01)

(58) Field of Classification Search
CPC ............ G02B 27/0172; G02B 27/0093; G02B 2027/0138; G02B 2027/014; G06F 3/011; G06K 9/00255; G06K 9/00288; G06V 40/166; G06V 40/172; G06V 40/174
See application file for complete search history.

(56) References Cited

U.S. PATENT DOCUMENTS

| | | | |
|---|---|---|---|
| 9,344,612 B2 | 5/2016 | Ritchey et al. | |
| 9,719,871 B2 | 8/2017 | Blum et al. | |
| 9,959,678 B2 | 5/2018 | Katz et al. | |
| 10,299,717 B2 | 5/2019 | Tzvieli et al. | |
| 10,398,373 B2 | 9/2019 | Nduka | |

(Continued)

FOREIGN PATENT DOCUMENTS

| | | |
|---|---|---|
| CN | 102109677 A | 6/2011 |
| CN | 103984102 A | 8/2014 |

(Continued)

*Primary Examiner* — Nelson M Rosario
(74) *Attorney, Agent, or Firm* — TREYZ LAW GROUP, P.C.; G. Victor Treyz; David K. Cole

(57) ABSTRACT

A system may include a head-mounted device. The head-mounted device may have a head-mounted housing that includes a display. The display is configured to display an image for viewing by a user when the user's eyes are located in eye boxes adjacent to the head-mounted housing. The head-mounted housing may have a compressible opaque light seal. The light seal may have a ring shape and may block stray ambient light around the periphery of the head-mounted housing, thereby ensuring that stray light does not interfere with viewing of the image by the user. Sensors may be provided in the light seal to measure facial expressions and gather other measurements. Information on a measured facial expression of a user can be transmitted to external devices so that the external devices can update corresponding facial expressions on an avatar to reflect the user's current facial expression.

21 Claims, 11 Drawing Sheets

(56) References Cited

U.S. PATENT DOCUMENTS

| | | | |
|---|---|---|---|
| 10,628,888 B2 | 4/2020 | Osterhout et al. | |
| 11,458,338 B2 | 10/2022 | Wilson et al. | |
| 2004/0077292 A1* | 4/2004 | Kim | B24B 1/005 |
| | | | 451/5 |
| 2008/0051946 A1* | 2/2008 | Breed | B60N 2/002 |
| | | | 701/1 |
| 2016/0216760 A1 | 7/2016 | Trutna et al. | |
| 2017/0276943 A1* | 9/2017 | Osman | A63F 13/211 |
| 2017/0287194 A1* | 10/2017 | Katz | G06F 3/012 |
| 2017/0365101 A1* | 12/2017 | Samec | G02B 27/017 |
| 2018/0103917 A1 | 4/2018 | Kim et al. | |
| 2018/0210492 A1* | 7/2018 | Chen | F04B 49/06 |
| 2018/0348863 A1* | 12/2018 | Aimone | G06F 3/011 |
| 2019/0099009 A1* | 4/2019 | Connor | A47C 21/048 |

FOREIGN PATENT DOCUMENTS

| | | |
|---|---|---|
| CN | 104615239 A | 5/2015 |
| CN | 104731342 A | 6/2015 |
| CN | 105183147 A | 12/2015 |
| CN | 105536118 A | 5/2016 |
| CN | 108549153 A | 9/2018 |
| CN | 110857865 A | 3/2020 |
| KR | 101633057 B1 | 6/2016 |
| WO | 2018142228 A2 | 8/2018 |

\* cited by examiner

ELECTRONIC DEVICE WITH FACIAL SENSORS

This application claims the benefit of provisional patent application No. 62/990,792, filed Mar. 17, 2020, which is hereby incorporated by reference herein in its entirety.

FIELD

This relates generally to electronic devices, and, more particularly, to wearable electronic devices such as head-mounted devices.

BACKGROUND

Electronic devices such as head-mounted devices have housings that are configured to be worn on a head of a user. As the user interacts with the head-mounted device, it can be difficult to gather information on the user's actions. For example, it may be difficult to determine the state of a user's facial expressions and other information on the user. This can make it challenging or impossible for a head-mounted device to respond satisfactorily to changing conditions.

SUMMARY

A system may include a head-mounted device. The head-mounted device may have a head-mounted housing. A display is configured to display an image for viewing by a user when the user's eyes are located in eye boxes adjacent to the head-mounted housing.

The head-mounted housing may have a compressible opaque light seal. The light seal may have a ring shape that runs along the peripheral edge of the housing. During use of the head-mounted device, the light seal rests between the user's face and the head-mounted housing. The light seal blocks stray ambient light around the periphery of the head-mounted housing, thereby preventing the stray light from interfering with viewing of the image by the user.

Facial sensors may be provided in the light seal to measure facial expressions and gather other measurements. Information on a measured facial expression of a user can be transmitted to external devices so that the external devices can update corresponding facial expressions on an avatar to reflect the user's current facial expression.

The sensors in the light seal may be formed from capacitive sensor electrodes. Capacitive sensors and other sensors in the light seal may measure contact (touch) between the light seal and a user's face, may measure applied force, and/or may measure deformation (displacement) of the light seal.

If desired, optical sensors may be used to measure the user's face. For example, a facial optical sensor may use an infrared light-emitting diode or other light emitter to emit light that is reflected from the user's face and measured by an infrared light detector or other detector. During changes in facial expression, blood flow through the muscles of the user's face is affected. Optical absorption of the emitted light is affected by blood flow, so an optical facial sensor based on infrared light measurements or other light measurements can measure facial expression changes.

Facial expression sensors may also include electromyography sensors, resistive sensors, strain gauges, accelerometers and other motion sensors, magnetic sensors, potentiometers, and other sensors. Actuators in the light seal may be controlled based on facial sensor measurements and other measurements. Facial sensor measurements and other measurements from light-seal sensors can be used for authentication, actuator adjustments, avatar control, health monitoring, sensor calibration, and other activities.

DETAILED DESCRIPTION

Electronic devices such as wearable electronic devices may include displays, speakers, haptic output devices, and other output devices for presenting output to users. These electronic devices may also include sensors for gathering environmental measurements, biometric data, and user input. The sensors may include one or more facial sensors. Facial sensors may, as an example, be mounted in a portion of a head-mounted device that serves as a light seal between the device and a user's face or may be mounted in other portions of a head-mounted device.

Figure 1:
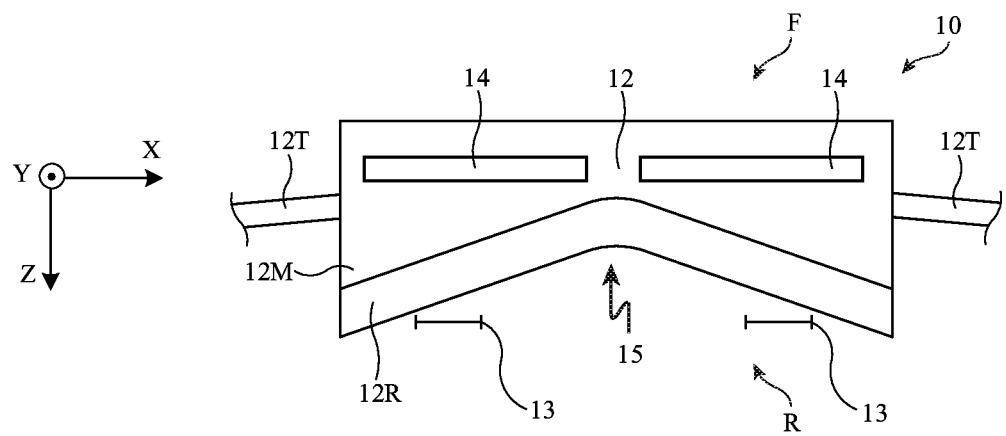
FIG. 1 is a top view of an illustrative head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T may be formed from fabric, polymer, metal, and/or other material. Support structures 12T may form a strap or other head-mounted support structures that help support device 10 on a user's head. A main support structure (e.g., main housing portion 12M) of housing 12 may support electronic components such as displays 14. Housing 12 may be configured to be worn on a head of a user and may form glasses, a hat, a helmet, goggles, and/or other head-mounted device.

Front face F of housing 12 may face outwardly away from a user's head and face. Opposing rear face R of housing 12 may face the user. Display 14 is mounted in housing 12. Display 14 faces inwardly toward eye boxes 13. During operation, a user's eyes are placed in eye boxes 13 and the user's nose is placed in nose region 15. When the user's eyes are located in eye boxes 13, the user may view images being displayed by display 14 through an associated optical system with lenses in housing 12. Front face F of device 10 faces away from eye boxes 13.

In some configurations, optical components such as display 14 are configured to display computer-generated content that is overlaid over real-world images (e.g., a user may view the real world through the optical components). In other configurations, which are sometimes described herein as an example, real-world light is blocked (e.g., by an opaque housing wall at front face F of housing 12 and/or other portions of device 10). To help ensure that displays 14, lenses, and other inwardly facing optical components are not exposed to undesired stray light that could adversely affect image quality, housing 12 may be provided with a light seal such as light seal 12R.

When device 10 is worn on a user's head, light seal 12R rests between main housing portion 12M (which may, as an example, be formed from rigid components such as components made of metal, rigid polymer, glass, ceramic, and/or other material) and the user's face. Light seal 12R is opaque and thereby prevents stray ambient light from entering the interior of device 10 and interfering with the user's viewing of the image presented by display 14.

To enhance user comfort, light seal 12R may be formed from soft compressible materials that conform to a user's face. When device 10 is being worn by a user, light seal 12R may form a light-tight boundary between the user's face and main housing portion 12M. The portion of main housing 12M that supports light seal 12R may, if desired, have a curved cross-sectional profile (as shown in FIG. 1). The curved shape of housing portion 12M may help housing 12M conform to the curved shape of the user's head. The curved section of housing portion 12M adjacent to nose region 15 may help housing 12M fit comfortably over a user's nose.

Figure 2:
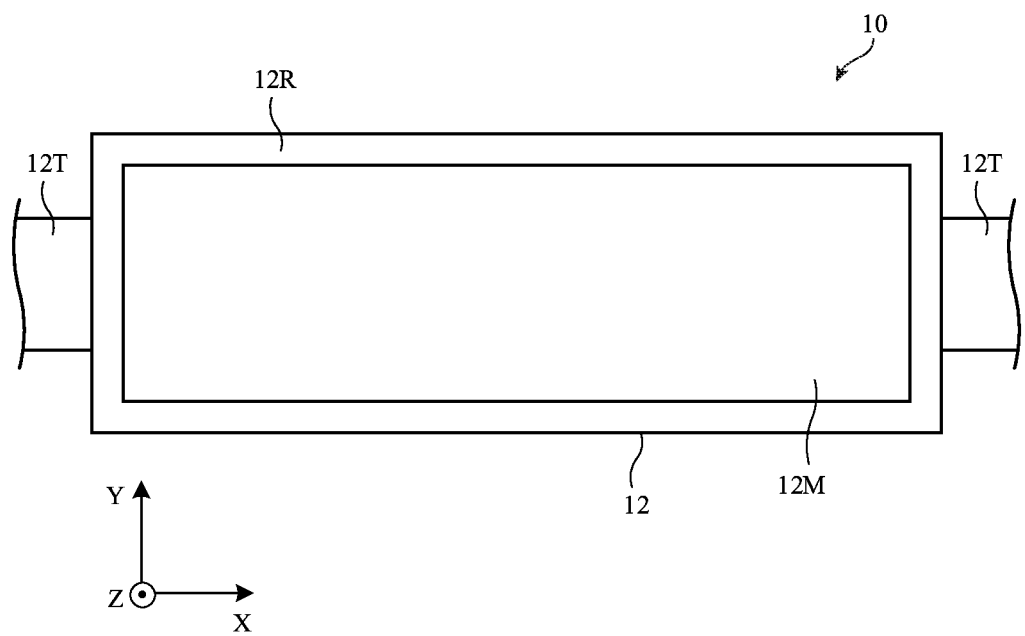
FIG. 2 is a rear view of an illustrative head-mounted device in accordance with an embodiment.

FIG. 2 is a rear view of device 10 of FIG. 1 showing how light seal 12R may run along the peripheral edge of main housing portion 12M of device 10 (e.g., to form a light sealing border structure around the perimeter of housing 12 on rear face R). Housing portion 12M may optionally have a wall portion on rear face R that runs under light seal 12R. Light seal 12R may have a rectangular outline, an oval outline, an outline with straight segments and curved segments, and/or other suitable shape. Light seal 12R may be continuous (e.g., to form a light sealing ring around the outer edge of the rear of housing 12) or may have one or more discontinuous segments that run along the periphery of housing 12. Configurations in which light seal 12R has a ring shape may sometimes be described herein as an example.

Figure 3:
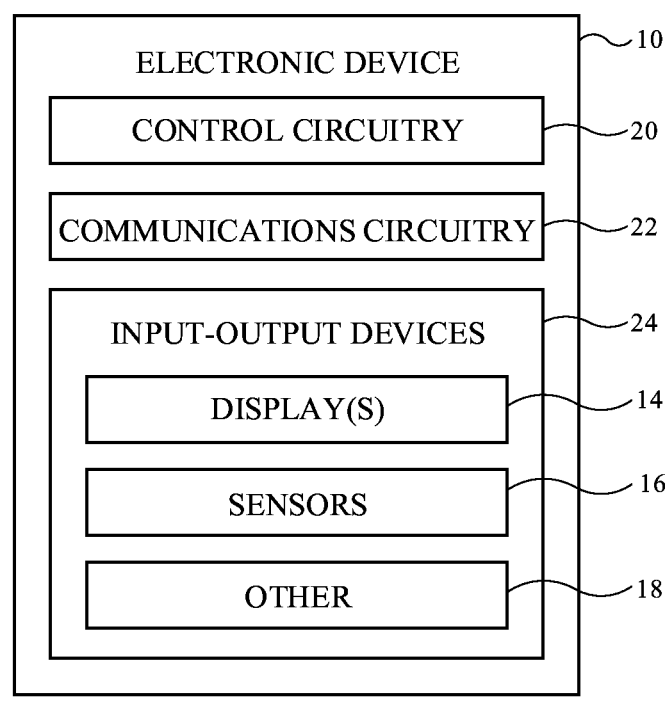
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit facial expression information and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display 14. Display 14 may be an organic light-emitting diode display, a liquid crystal display, a microelectromechanical systems display (e.g., a scanning mirror display), a display having a pixel array formed from crystalline semiconductor light-emitting diode dies (sometimes referred to as microLEDs), and/or other display.

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Light seal 12R may be formed from one or more materials. These materials may include soft materials that deform (e.g., by compressing, flexing, etc.). This allows light seal 12R to change shape in response to applied pressure from the portions of the user's face that contact and press against these materials. The ability of light seal 12R to deform when device 10 is being worn on a user's head and housing 12 is pressing against the user's face may help enhance user comfort.

Figure 4:
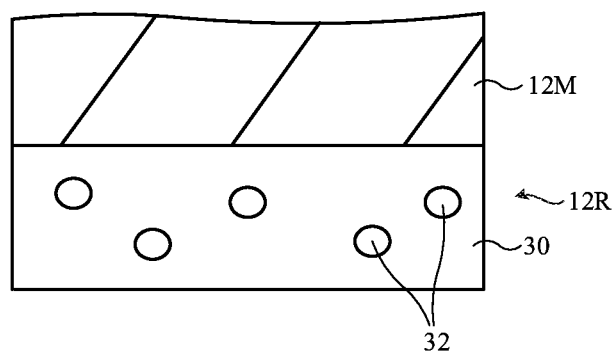
FIG. 4 is a cross-sectional view of a light seal formed from foam in accordance with an embodiment.
Figure 5:
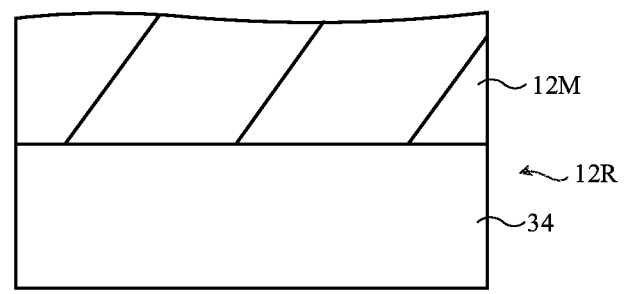
FIG. 5 is a cross-sectional view of a light seal formed from an elastomeric polymer in accordance with an embodiment.

FIG. 4 is a cross-sectional side view of light seal 12R in an illustrative configuration in which light seal 12R is formed from open-cell or closed-cell foam containing voids (air pockets) 32. In the example of FIG. 5, light seal 12R is formed from a ring-shaped strip of elastomeric polymer (e.g., silicone, etc.). To ensure that light seal 12R is sufficiently soft to be compressed to conform to surface height variations across the user's face, it may be desirable for light seal 12R to be formed from one or more materials with a Young's modulus of elasticity (elastic modulus) of less than 0.1 MPa, less than 1 MPa, or less than 10 MPa (as examples).

Figure 6:
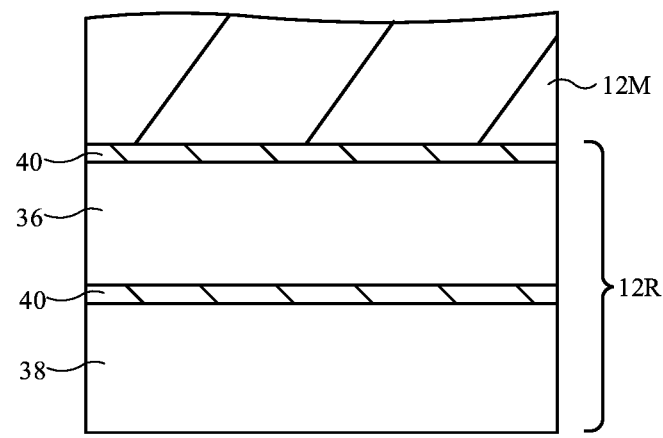
FIG. 6 is a cross-sectional view of a light seal formed from multiple layers of material that have been attached to each other using layers of adhesive in accordance with an embodiment.

If desired, more than one material may be incorporated into light seal 12R. As shown in FIG. 6, for example, light seal 12R may be formed from inner layer 36 and outer layer 38. Layers 36 and 38 may have ring shapes that run along a ring-shaped protruding edge portion of housing portion 12M on rear face R of device 10 or other supporting portion of housing 12. Adhesive 40 may be used to attach layers 36 and 38 together and may be used to attach light seal 12R to housing portion 12M. The structure(s) that make up light seal 12R may be opaque. For example, light seal 12R may be formed from black foam, silicone or other elastomeric polymers that contain dark colorant (e.g., black dye or pigment, etc.), and/or other light-blocking materials. With this type of configuration, light seal 12R may block stray light and thereby prevent ambient light in the environment surrounding device 10 such as stray visible light, stray infrared light, and/or stray ultraviolet light from reaching the interior of device 10 while device 10 is being worn on a user's face.

Figure 7:
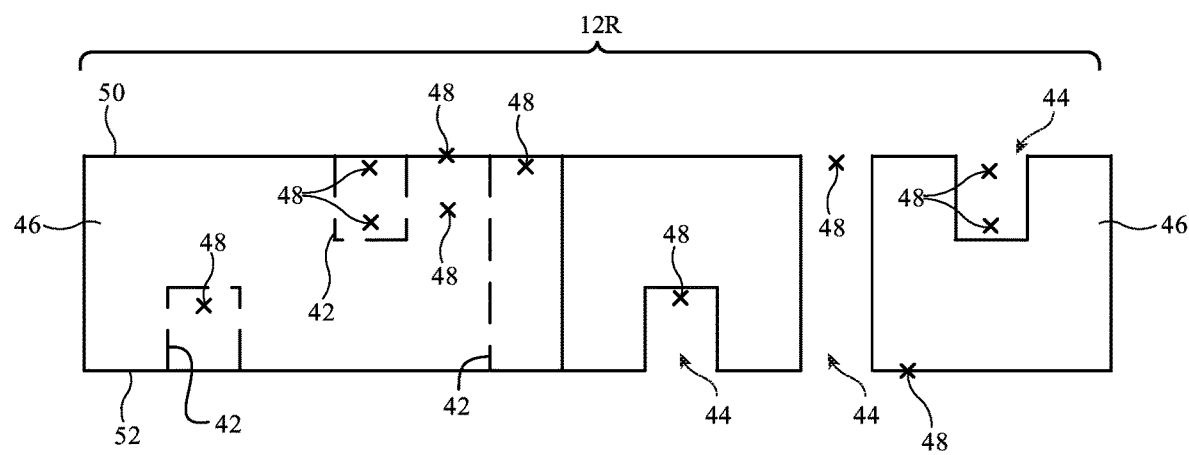
FIG. 7 is a cross-sectional view of an illustrative light seal showing illustrative locations for sensor circuitry in accordance with embodiments.

Sensors such as facial sensors may be placed at one or more locations in light seal 12R. Light seal 12R may also be provided with one or more openings or other features to accommodate sensors. Consider, as an example, light sensor 12R of FIG. 7. As shown in FIG. 7, light seal 12R may have a first surface such as surface 50 that is attached to housing 12M and a second surface such as surface 52 that is configured to rest against a user's face during use of device 10. Light seal 12R may be formed from light seal material 46 (e.g., foam, elastomeric material, and/or other compressible material). Light seal 12R may be formed from a ring-shaped member that rests against a ring-shaped peripheral wall on rear face R of housing portion 12M. To accommodate sensors such as facial sensors, light seal 12R may be provided with holes 42 that pass partially through seal 12R (from surface 50 and/or surface 52 of material 46), through-holes 42 that pass completely through material 46 of seal 12R (e.g., cylindrical openings that pass from surface 50 to surface 52), slot-shaped openings 44 that pass completely through material 46 from surface 50 to surface 52 and thereby divide the ring of material 46 forming seal 12R, and/or slot-shaped openings 44 that extend partly through material 46 from surface 52 or from surface 50. Sensors such as facial sensors may be placed at illustrative locations such as locations 48 (e.g., at the upper or lower surfaces of openings in seal 12R, embedded in the middle of material 46, at surface 50, at surface 52, etc.).

Figure 8:
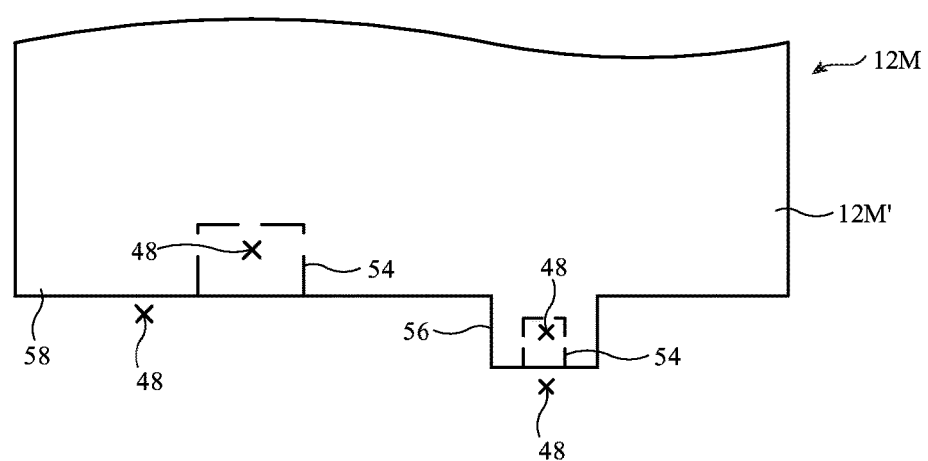
FIG. 8 is a cross-sectional view of an illustrative housing member with features such as recesses and protrusions for mounting sensors adjacent to a light seal in accordance with an embodiment.

FIG. 8 is a cross-sectional view of a housing portion such as ring-shaped housing wall structure 12M' formed by a rearwardly protruding edge portion of housing portion 12M or other portion of housing 12. Structure 12M' may extend toward the user's face around the periphery of housing portion 12M on rear face R and may have a rear surface 58 that faces the user's face. Light seal 12R may be attached to surface 58 using adhesive (as an example). Structure 12M' may have protrusions such as protrusion 56 and/or openings such as recess 54 in surface 58 and optional recess 54 in protrusion 56 to receive facial sensors or other sensors (e.g., sensors at locations such as locations 48). Any of the openings and protrusions associated with surface 58 of structure 12M' may be aligned with any of the holes and/or slots in material 46 of light seal 12R of FIG. 7.

Facial sensors may be used to monitor the movement and location of the skin on the user's face, thereby allowing device 10 to gather information such as facial features (e.g., for biometric authentication operations), facial expressions (e.g., for controlling an avatar), device orientation (e.g., so that sensor data from other sensors may be calibrated), skin-related health data (e.g., data such as information on moisture, temperature, blood oxygen content, heart rate, blood flow, skin color, and other information that may be used in health-related applications), skin pressure (e.g., pressure information that can be used in automatically adjusting the fit of device 10 on the user's head), and/or other information associated with a user's face.

If desired, rear-facing image sensors in housing portion 12M may be used to monitor parts of the user's face. The presence of light seal 12R may tend to restrict the field of view of such sensors. To expand the coverage of these sensors and/or to gather information other than that available with rear-facing image sensors, one or more sensors 16 (e.g., facial sensors) may be incorporated into device 10 within light seal 12R (e.g., at locations 48 of FIGS. 7 and/or 8). A single sensor element may be located at a single point along the length of light seal 12R or multiple sensor elements may be provided along the length of light seal 12R to provide additional sensor data. For example, an array of sensors (sensor elements) may be formed along the length of light seal 12R to gather sensor information along the periphery of housing 12.

Any suitable sensors may be used in light seal 12R to measure facial data (e.g., one or more of sensors 16 and/or other sensors).

Figure 9:
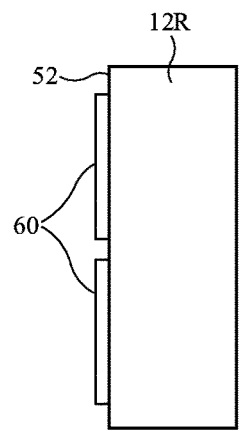
FIG. 9 is a cross-sectional view of an illustrative light seal with an electromyography (EMG) sensor in accordance with an embodiment.

In the illustrative configuration of FIG. 9, electrodes 60 (e.g., metal patches and/or other conductive structures) have been formed on rearwardly facing surface 52 of light seal 12R. During operation, electrodes 60 may contact the skin of the user's face. Control circuitry 20 (FIG. 3) may use electrodes 60 to sense electrical activity due to muscle activity in the user's face. For example, electrodes 60 may form an electromyography (EMG) sensor. With an electromyography facial sensor, facial movement (e.g., when a user smiles) can be electrically measured.

Figure 10:
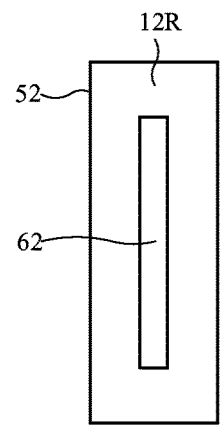
FIG. 10 is a cross-sectional view of an illustrative light seal with a force sensor formed from a strain gauge in accordance with an embodiment.

Another illustrative facial sensor arrangement is shown in FIG. 10. In the example of FIG. 10, a force sensor has been formed by embedding strain gauge 62 in light seal 12R. As the user wears device 10, the user's face will apply pressure to light seal 12R and will tend to deform light seal 12R. Deformations of light seal 12R (twisting, bending, etc.) may arise both from the user's facial shape and changes to the user's facial expression and/or other real-time changes to the shape of the user's face. Strain gauge 62 may measure deformations to light seal 12R in portions of light seal 12R in the vicinity of strain gauge 62 (e.g., portions of light seal 12R that overlap strain gauge 62).

Figure 11:
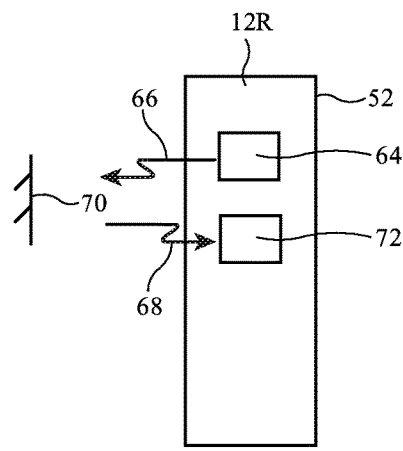
FIG. 11 is a cross-sectional view of an illustrative light seal with an optical sensor in accordance with an embodiment.

In the example of FIG. 11, a facial sensor has been formed from optical components. The sensor of FIG. 11 includes light emitter 64 and light detector 72. Light emitter 64 may be a light-emitting diode, laser, lamp, or other light source that emits light 66 towards the skin of the user's face (face 70). Light detector 72 may be a photodetector such as a photodiode. Light detector 72 may measure light 66 after light 66 has reflected (specularly and/or diffusely) from the skin of face 70 (see, e.g., reflected light 68). Light 66 (and light 70) may be infrared light, visible light, and/or ultraviolet light. In some configurations, the emitted light penetrates face 70 and can therefore measure skin attributes associated with the user's blood. These attributes may include blood flow, blood oxygen level, and heart rate. Muscle activity may, as an example, affect blood flow in the user's face that can be measured by measuring infrared light absorption or other light absorption with an optical sensor. As another example, when a patch of skin in face 70 is subjected to pressure from surface 52, some of the blood near that patch of skin will be forced away, causing the patch of skin to appear lighter in color (less red). Accordingly, an optical sensor such as the sensor of FIG. 11 can be used to measure how much pressure is being exerted against face 70. If desired, optical sensors that measure how much emitted light is reflected back towards the sensor may serve as proximity sensors. Detector 72 may also make light absorption measurements (associated with the amount of blood present in face 70) to detect facial conditions such as blushing. Blood content and/or other attributes affecting skin hue may, if desired, be assessed by providing detector 72 with multiple color channels and the ability to make spectral measurements.

Figure 12:
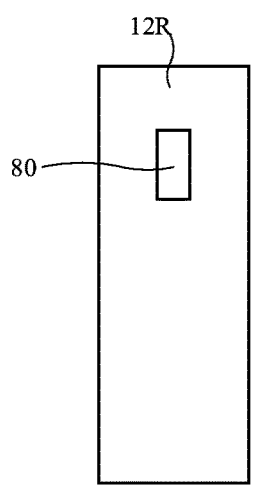
FIGS. 12 and 13 are cross-sectional views of an illustrative light seal with a motion sensor such as an inertial measurement unit or accelerometer in accordance with an embodiment.
Figure 13:
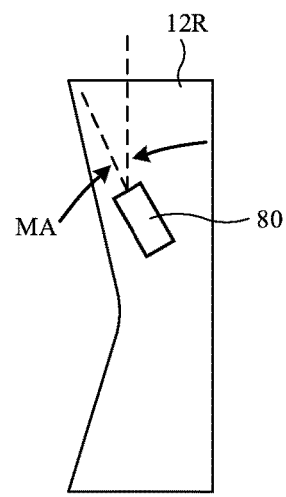

In the example of FIGS. 12 and 13, a sensor (sensor 80) that measures position, orientation, and/or motion such as an inertial measurement unit (e.g., an accelerometer, compass, and/or gyroscope) has been incorporated into light seal 12R. When light seal 12R is not deformed, sensor 74 nominally has an upright orientation as shown in FIG. 13. When light seal 12R is deformed as shown in FIG. 13, sensor 74 can measure the angle of deflection of sensor 74 resulting from the deformation of light seal 12R (e.g., angle MA in the example of FIG. 13). Motion of sensor 74 can be detected using an accelerometer (e.g., to detect when seal 12R is deformed inwardly by pressure from the user's face or is deformed outwardly when facial pressure is released and/or to detect movement of sensor 80 along the length of seal 12R due to shearing forces).

Figure 14:
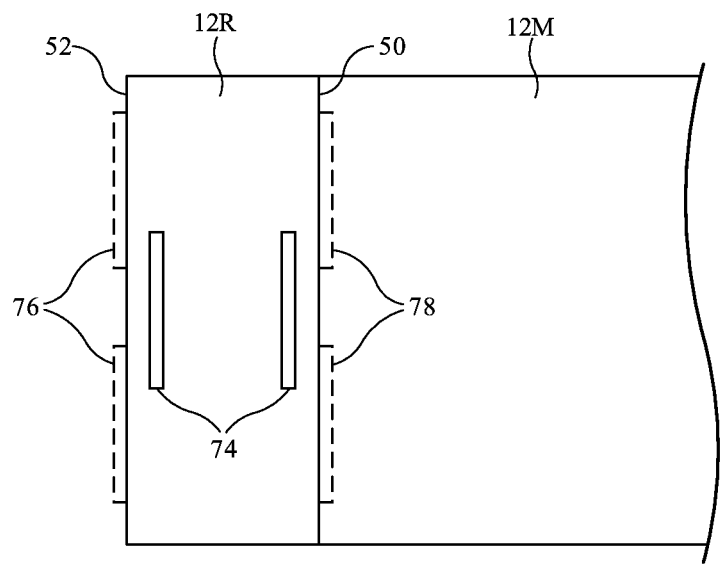
FIG. 14 is a cross-sectional view of a light seal with capacitive sensor electrodes in accordance with an embodiment.

If desired, capacitive sensing techniques may be used for forming facial sensors. Consider, as an example, the sensor of FIG. 14. As shown in FIG. 14, capacitive electrodes may be embedded in light seal 12R (see, e.g., electrodes 74), may be formed on surface 52 (see, e.g., electrodes 76), and/or may be formed on surface 50 (see, e.g., electrodes 78). Control circuitry 20 may use one or more of these capacitive sensor electrodes to make self-capacitance and/or mutual capacitance measurements. These measurements may be used to produce touch sensor data, force sensor data, and/or displacement data (e.g., data associated with the thickness of seal 12R). For example, when electrodes 74 are compressed towards each other, the capacitance between electrodes 74 will rise in proportion to the applied force (e.g., electrodes 74 form a force sensor and measure displacement). As another example, when skin is placed against electrodes 76, changes in measured capacitance reflect the contact (touch) of the skin against electrodes 76 (e.g., electrodes 76 form a touch sensor).

Figure 15:
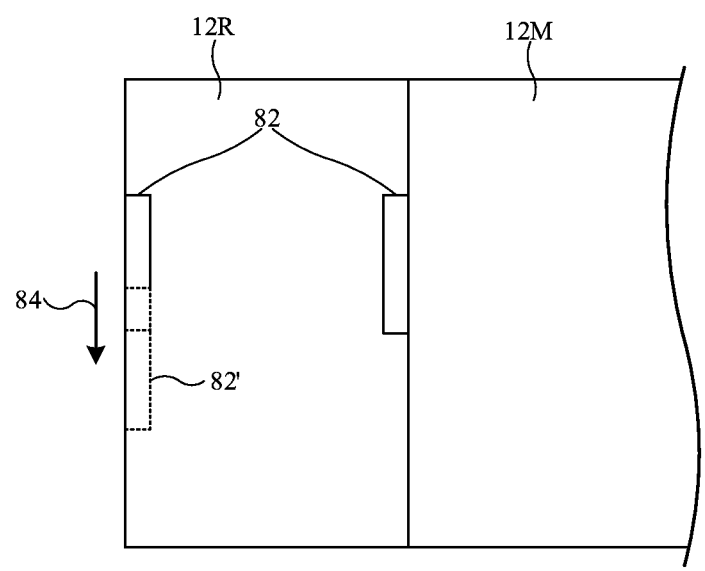
FIG. 15 is a cross-sectional view of an illustrative light seal with a shear force sensor formed from capacitive sensor electrodes in accordance with an embodiment.

In some capacitive sensor arrangement, shear forces (forces along the length of seal 12R rather than parallel to the surface normal of surface 52) may be measured. An illustrative shear force sensor formed from capacitive sensor electrodes 82 is shown in FIG. 15. Initially, when no shearing forces are applied by the user's face to light seal 12R, electrodes 82 overlap and exhibit a first capacitance value. When shear force is applied to surface 52 in direction 84, the capacitor electrode 82 on surface 52 moves to position 82', which is out of alignment with the electrode on housing portion 12M. This reduces the measured capacitance from the first capacitance value to a lower second capacitance value that is proportional to the amount of applied shear force.

Figure 16:
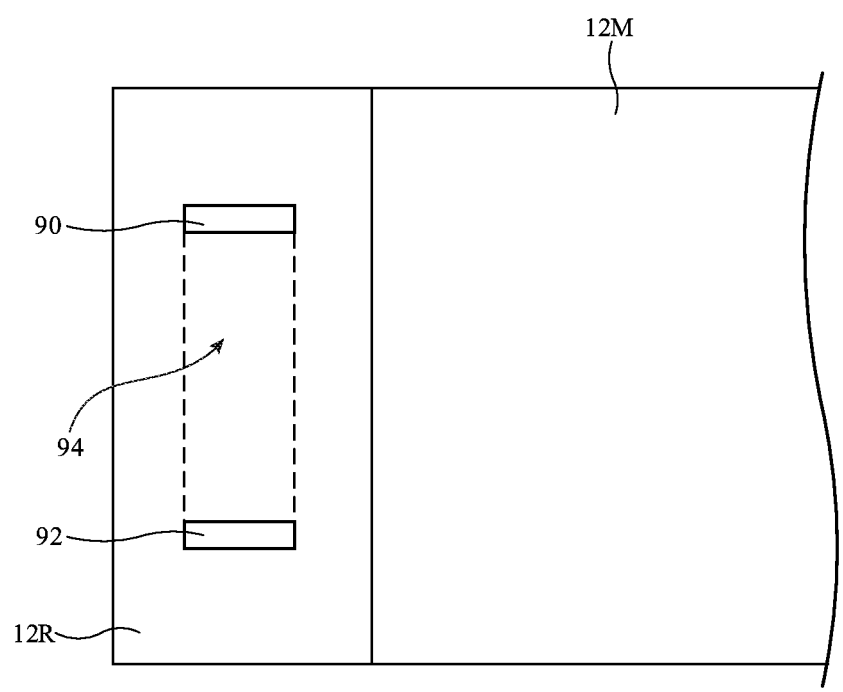
FIG. 16 is a cross-sectional view of an illustrative light seal with a resistive force sensor in accordance with an embodiment.

FIG. 16 is a cross-sectional view of light seal 12R in an illustrative configuration in which a facial sensor has been implemented using a resistive sensor. As shown in FIG. 16, electrodes 92 and material 94 (part of the material of light seal 12R or separate material) are formed in light seal 12R. When pressure is applied to material 94 to compress material 94, the resistance of material 94 changes. Control circuitry 20 can measure the resistance between electrodes 90. Force measurements (the amount of pressure applied to seal 12R by the user's face) can be determined from the changes in resistance that are detected. In this way, the resistive sensor can serve as a touch and/or a force sensor and/or may measure changes in the thickness of seal 12R. If desired, the sensor of FIG. 16 and/or other sensors that measure touch, force (and corresponding amounts of displacement), and/or other attributes indicative of the present of the user's face against seal 12R may be used as face presence detectors (e.g., to detect when device 10 is being worn by a user and to detect when device 10 is not being worn by a user).

Figure 17:
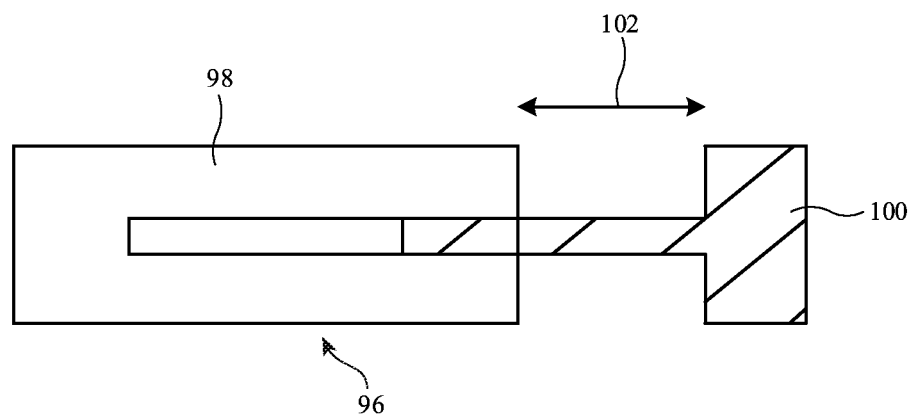
FIG. 17 is a cross-sectional view of an illustrative linear potentiometer for measuring light seal movement in accordance with an embodiment.

FIG. 17 is a cross-sectional side view of an illustrative facial sensor formed from a linear potentiometer. Potentiometer 96 has first portion 100 with a shaft that moves in and out of second portion 98. The amount that the shaft extends into portion 98 affects the measured resistance of potentiometer 96. Potentiometer 96 may be placed within light seal 12R. When light seal 12R is compressed, the shaft of portion 100 may be forced into portion 98 and the resulting resistance change (and therefore a measure of the applied force) can be determined by control circuitry 20. When used in this way, potentiometer 96 may serve to measure touch, force, and/or displacement in seal 12R.

Figure 18:
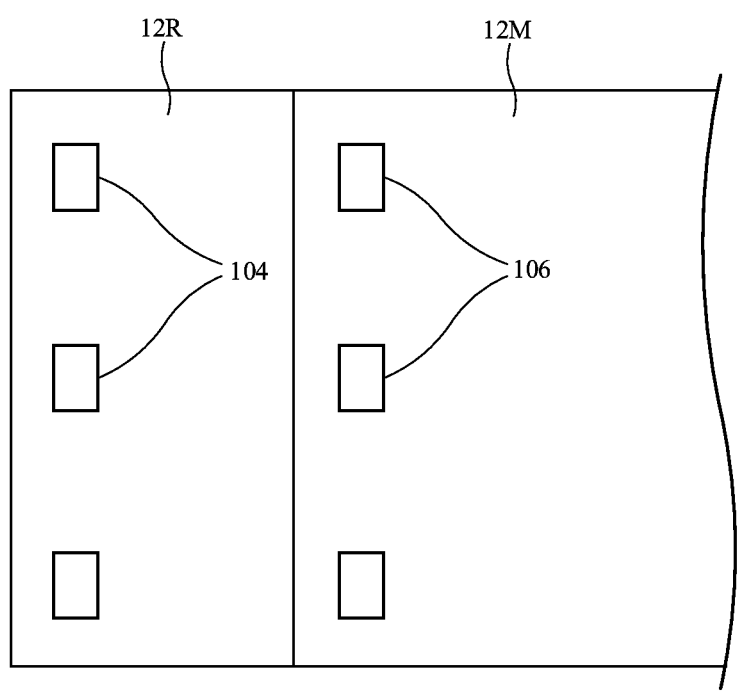
FIG. 18 is a cross-sectional view of an illustrative magnetic sensor configuration for a light seal in accordance with an embodiment.

If desired, facial sensors for light seal 12R may be formed using magnetic sensor arrangements. As shown in FIG. 18, light seal 12R may, as an example, be provided with an array of magnets 104 (e.g., permanent magnets, magnetized portions of light seal 12R, and/or other magnetized structures). Each magnet 104 may have a corresponding magnetic sensor 106 located at a fixed location relative to housing portion 12M. Sensors 106 may be, as an example, Hall effect magnetic sensors. When a given one of magnets 104 is pressed inwardly due to facial force on light seal 12R, a corresponding increase in magnetic field may be measured by an associated magnetic sensor 106. In this way, the magnetic sensor arrangement of FIG. 18 may measure touch, force, and/or displacement of light seal 12R.

Figure 19:
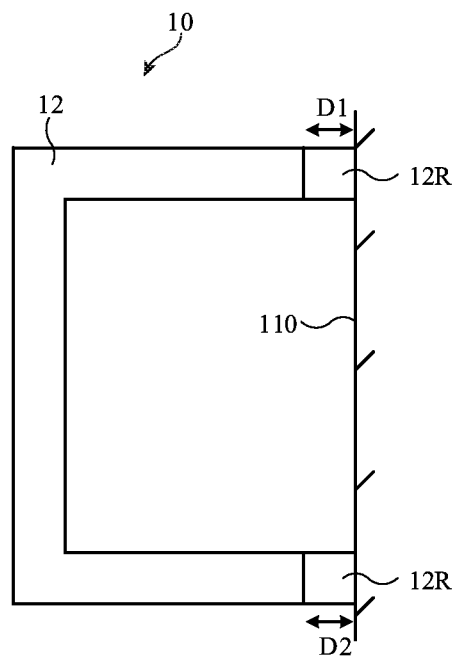
FIG. 19 is a cross-sectional side view of an illustrative head-mounted device with light seal sensors in an upright (non-tilted) orientation in accordance with an embodiment.
Figure 20:
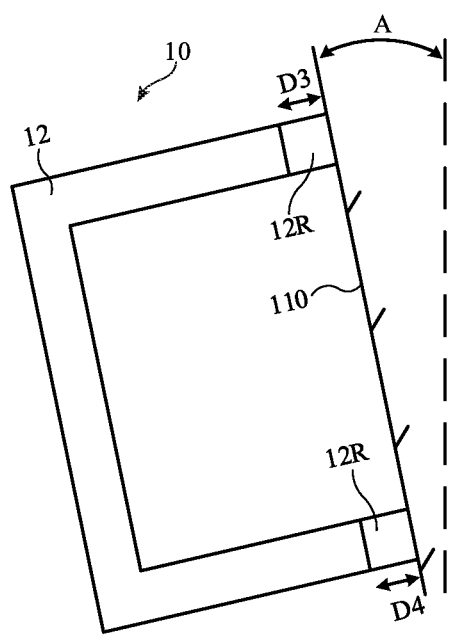
FIG. 20 is a cross-sectional side view of the head-mounted device of FIG. 19 in a tilted position in accordance with an embodiment.

FIGS. 19 and 20 show how light seal facial sensors may be used to measure the orientation of device 10 relative to a user. In the examples of FIGS. 19 and 20, facial sensors (e.g., capacitive sensors serving as force and displacement sensors) that measure the local thickness of light seal 12R have been placed in light seal 12R. In the configuration of FIG. 19, the user's face 110 is oriented vertically (e.g., the user is facing straight ahead) and device 10 is resting normally on the user's head. In this scenario, a first sensor measures that light seal 12R has a thickness D1 near the top of the user's head and has a thickness D2 near the bottom of the user's head. If the user's head is tilted downward during use of device 10, device 10 and housing 12 will tilt at an angle A away from vertical, as shown in FIG. 20. The weight of housing 12 and the components of device 10 will cause the amount of force at the top and bottom of the light seal to change when housing 12 is tilted at angle A. In particular, the lower portion of seal 12R may tend to swing away from face 110, thereby reducing pressure on this portion of seal 12R and increasing D4 to a value larger than D2. Displacement value D3 may, in turn, become smaller than D1 of FIG. 19. Because of the changes of the thickness of light seal 12R, housing 12 will tilt slightly relative to face 110, which will tend to misorient display 14 and lenses associated with display 14 relative to the user's eyes. By using the measured values of D4 and D3 relative to the original values of D2 and D1, the amount of shift in the orientation of display 14 relative to the user's eyes can be determined. Control circuitry 20 can then issue commands to display 14 and/or other components in device 10 (e.g., actuators) to adjust device 10 and/or to shift the displayed image on display 14 and/or otherwise modify the content being displayed on display 14 to compensate for the measured amount of change in display orientation (e.g., control circuitry 20 can calibrate display 14 and/or locally change the thickness of seal 12R to compensate for measured changes in display orientation based on the measured facial sensor data).

Figure 21:
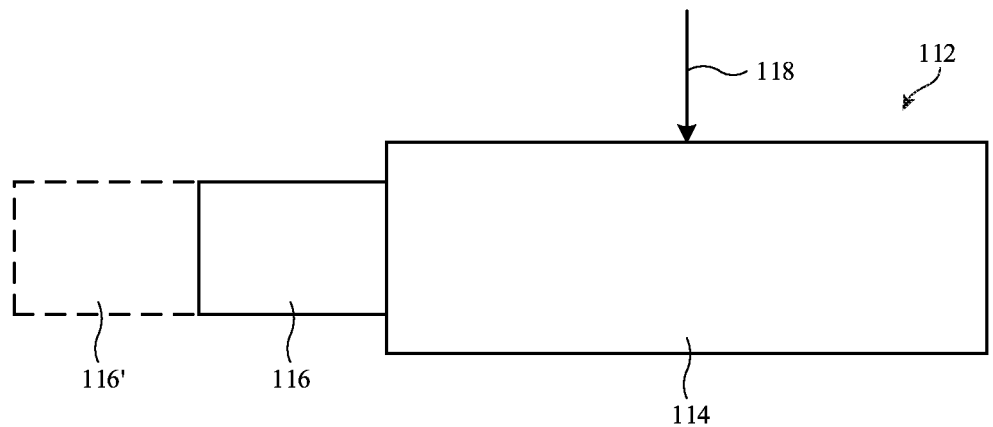
FIG. 21 is a side view of an illustrative actuator that may be used to adjust a light seal in accordance with an embodiment.

Control circuitry 20 may use actuators to adjust the size, shape, stiffness, and/or other attributes of light seal 12R. For example, actuators may be used to adjust light seal 12R of FIG. 20 so that D4 is equal to D2 and so that D3 is equal to D1, thereby ensuring that the user's display 14 is oriented in a desired direction. FIG. 21 is a cross-sectional side view of an illustrative actuator. As shown in FIG. 21, actuator 112 may include a first portion 114 and a second portion 116. Second portion 116 may move relative to portion 114 in response to control commands received from control circuitry 20 at control signal input 118. For example, in response to a command to extend portion 116, portion 116 may move to location 116'. Actuator 112, which may be embedded in light seal 12R, may be a piezoelectric actuator formed from electroactive polymer or ceramic piezoelectric material or may be an electromagnetic actuator. For example, actuator 112 may be an electromagnetic system such as a solenoid system or other electromagnetic actuator system, may be based on a motor (e.g., a stepper motor). In general, actuator 112 may be any suitable type of actuator (electromagnetic, piezoelectric, thermal, etc.).

Figure 22:
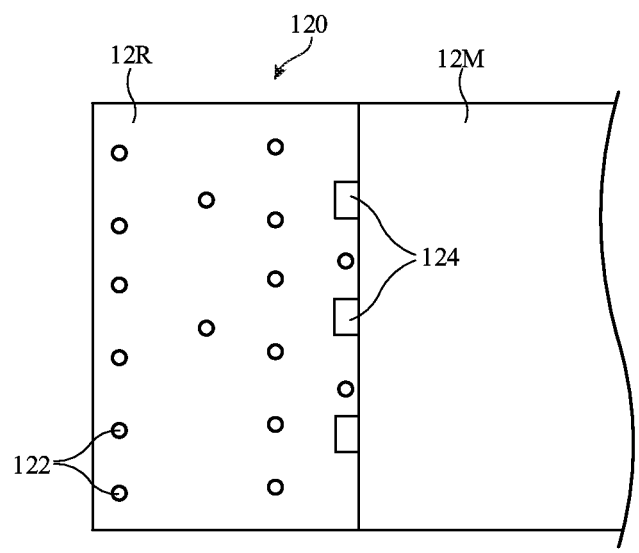
FIG. 22 is a cross-sectional side view of an illustrative magnetorheological device for adjusting a light seal in accordance with an embodiment.

In the example of FIG. 22, actuator 120 is a magnetorheological device. Magnetorheological devices may be based on magnetorheological elastomers, magnetorheological fluids (e.g., fluid in a pocket in seal 12R), and/or other materials that exhibit a change in elastic modulus as a function of applied magnetic field (the magnetorheological effect). In the example of FIG. 22, light seal 12R is formed from an elastomeric polymer. Magnetic particles 122 are embedded in this polymer. Adjustable magnetic field sources 124 (e.g., coils forming electromagnets that are controlled by control circuitry 20) are placed adjacent to light seal 12R. When control circuitry 20 adjusts the magnetic fields produced by sources 124, the magnetic fields applied to light seal 12R are changed and the modulus of light seal 12R changes. This allows seal 12R to serve as an electrically controlled actuator to adjust the position (e.g., the thickness) and/or modulus of seal 12R.

Figure 23:
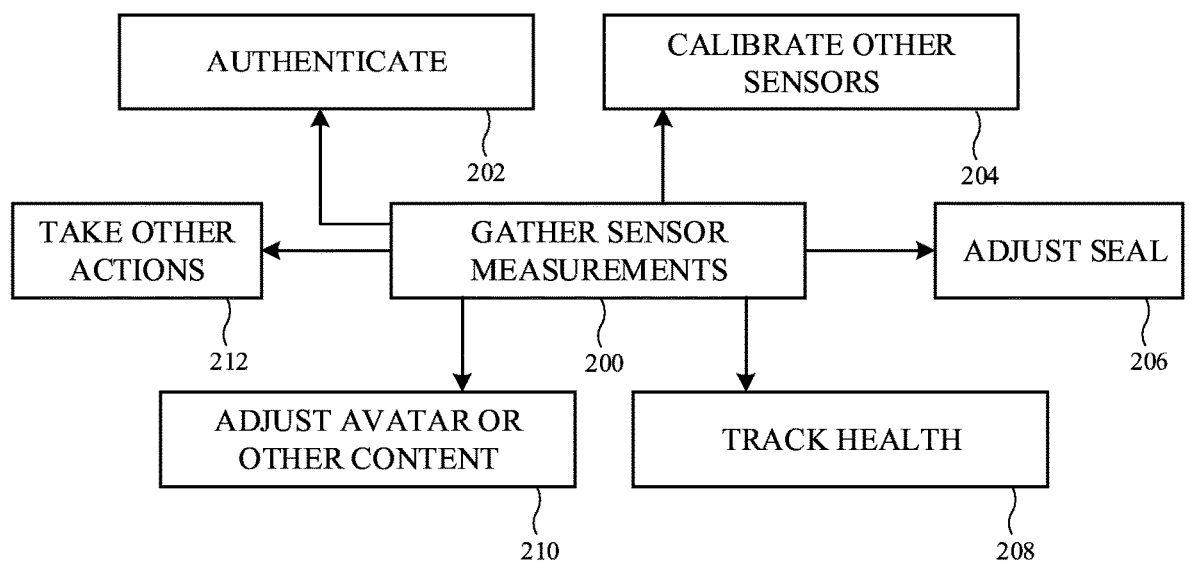
FIG. 23 is a flow chart of illustrative operations involved in using a head-mounted device with light seal sensing circuitry in accordance with an embodiment.

FIG. 23 is a flow chart of illustrative operations associated with operating device 10. During the operations of block 200, control circuitry 20 can gather sensor measurements from one or more sensors 16 in device 10 such as facial sensors and/or other sensors 16 in light seal 12R and/or facial image sensors or other sensors 16 located in other portions of housing 12M. An array of facial sensors may, for example, extend along the seal 12R (e.g., in a ring around the periphery of housing 12M). Different sensors measure different portions of the user's face and gather information such as facial pressure, facial movement (vertical movements toward and away from seal 12R, shear movements along the surface of seal 12R, etc.), facial shape (from the measured thickness of seal 12R at locations along its length), and/or other facial information (skin color, muscle activity, temperature, hear rate, blood flow, blood oxygen level, etc.).

During the operations of block 202, device 10 may, if desired, use the information gathered about the user's face to authenticate the user. Control circuitry 20 may, for example, compare the facial measurements to known facial measurements previously registered for a particular user. In this way, the user's identity can be confirmed before device 10 provides the user with access to user-specific content and device functions.

During the operations of block 204, facial sensor measurements (e.g., displacements of the type described in connection with FIGS. 19 and 20) may be used to adjust a display (e.g., to compensate for misalignment, etc.).

During the operations of block 206, actuators in seal 12R may be adjusted based on facial sensor measurements. For example, discomfort associated with locations on seal 12R that have elevated amounts of facial pressure can be reduced by selectively decreasing seal thickness in those locations.

During the operations of block 208, health tracking measurements may be used to update a health monitoring application, to issue alerts for a user ("your heart rate is 120 bpm"), and/or to take other suitable health related actions. As an example, if a monitored health-related sensor reading deviates from expected limits, the user may be presented with visual and/or audible alert messages.

During the operations of block 210, skin movement on the user's face can be used to determine the user's facial expression and to track how the user's facial expression is changing. If, for example, shear movement upward near the corners of the user's mouth is measured by the facial sensors in seal 12R, control circuitry 20 can determine that the user is making a smile. A computer-generated representation of the user (e.g., an avatar) that is being controlled by control circuitry 20 can be provided with a facial expression that is updated to include a corresponding smile. If the user stops smiling, the avatar can be updated in real time accordingly.

Facial expression data from the facial sensors in light seal 12R may be used separately from any facial expression data gathered by a rearwardly-facing camera in device 10 and/or may be used to supplement facial expression data from an image sensor in device 10 (e.g., to enhance accuracy). By ensuring that the avatar's facial expression tracks the user's real-world facial expression, the user's emotions may be accurately conveyed to others who are viewing the avatar. The avatar that is presented may be displayed for the user on display 14 and/or may be displayed for others on other displays (e.g., by transmitting facial expression information to other equipment such as one or more external electronic devices that wirelessly communicate with device 10). As an example, in response to detecting a facial expression using (at least partly) facial sensor data from light seal 12R, control circuitry 20 may transmit information on the user's current measured facial expression to a computer, head-mounted device, and/or other electronic device of one or more people other than the user in real time so that the electronic devices of those people can update the displayed avatar accurately in real time.

Other actions may be taken in response to measured facial sensor data, if desired (block 212). As an example, video playback may be automatically commenced when a facial sensor detects that a user has placed device 10 on the user's head and/or video playback may be automatically stopped when a facial sensor detects that the user has removed device 10 from the user's head.

These activities that may be taken by device 10 based on facial sensor measurements from sensors in seal 12R are illustrative. In general, any suitable actions that may be taken in device 10 may be taken based partly or fully on facial sensor measurements. If desired, facial sensor measurements from sensors in light seal 12R may be supplemented and/or replaced using sensors in device 10 that are not associated with light seal 12R (e.g., image sensors and/or other facial sensors in main housing portion 12R). Moreover, sensor data from non-light-seal sensors and light seal facial sensors may be used together (e.g., this data may be fused to help refine and/or confirm the actions to be taken). Configurations in which device 10 takes action based solely on sensor measurements from facial sensors in light seal 12R are illustrative.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device configured to communicate with external equipment, comprising:
   a display configured to display an image for viewing from eye boxes;
   a head-mounted housing in which the display is mounted, wherein the head-mounted housing has a structure and a light seal that is configured to prevent stray light from interfering with viewing of the image, the light seal has opposing first and second surfaces, and the second surface is coupled to the structure;
   a facial sensor embedded in the light seal between the first and second surfaces and that is configured to measure a facial expression, wherein a portion of the light seal is interposed between the facial sensor and the first surface; and
   control circuitry configured to transmit information on the facial expression to external electronic equipment.

2. The head-mounted device defined in claim 1 wherein the light seal comprises a compressible material and wherein the facial sensor comprises capacitive sensor electrodes coupled to the compressible material.

3. The head-mounted device defined in claim 2 wherein the capacitive sensor electrodes are configured to measure shear forces along the light seal.

4. The head-mounted device defined in claim 2 wherein the capacitive sensor electrodes are configured to gather facial force measurements.

5. The head-mounted device defined in claim 1 wherein the facial sensor comprises an electromyography sensor.

6. The head-mounted device defined in claim 1 wherein the facial sensor comprises a motion sensor.

7. The head-mounted device defined in claim 1 wherein the facial sensor comprises a sensor selected from the group consisting of: an accelerometer, a compass, and a gyroscope.

8. The head-mounted device defined in claim 1 wherein the facial sensor comprises an optical sensor.

9. The head-mounted device defined in claim 8 wherein the optical sensor comprises a light-emitting device configured to emit light and a light detector configured to detect the emitted light after the emitted light has reflected from a face.

10. The head-mounted device defined in claim 1 wherein the facial sensor comprises a magnetic sensor configured to measure force against the light seal.

11. The head-mounted device defined in claim 1 further comprising an actuator, wherein the control circuitry is configured to adjust the light seal using the actuator in response to information gathered with the facial sensor.

12. The head-mounted device defined in claim 11 wherein the actuator comprises an electromagnetic actuator.

13. The head-mounted device defined in claim 11 wherein the actuator comprises a magnetorheological device.

14. A head-mounted device, comprising:
   a display configured to display an image for viewing from eye boxes;
   a head-mounted housing in which the display is mounted, wherein the head-mounted housing has a ring-shaped light seal that is configured to prevent stray light from interfering with viewing of the image, wherein the light seal has a periphery, and wherein the light seal comprises a compressible member selected from the group consisting of: an elastomeric polymer member and a foam member; and
   an optical sensor in the light seal within the periphery of the light seal, wherein the optical sensor is configured to measure an amount of pressure exerted by the head-mounted housing on a face.

15. The head-mounted device defined in claim 14 wherein the optical sensor is configured to detect blood flow associated with facial muscles.

16. The head-mounted device defined in claim 14 wherein the optical sensor comprises an optical facial sensor including an infrared light-emitting diode that emits infrared light and an infrared light detector that detects the infrared light and wherein the head-mounted device comprises control circuitry configured to perform facial expression measurement operations and health monitoring operations using information from the optical facial sensor.

17. A head-mounted device, comprising:
   a display configured to display an image for viewing from eye boxes;
   a head-mounted housing in which the display is mounted, wherein the head-mounted housing has a structure and a peripheral ring-shaped light seal that is configured to prevent stray light from interfering with viewing of the image, the peripheral ring-shaped light seal has opposing first and second surfaces, and the second surface is coupled to the structure; and
   a motion sensor embedded in the light seal that is configured to detect facial expressions, wherein a portion of the peripheral ring-shaped light seal is interposed between the motion sensor and first surface.

18. The head-mounted device defined in claim 17 wherein the motion sensor comprises an accelerometer.

19. The head-mounted device defined in claim 18 wherein the light seal comprises a compressible member.

20. The head-mounted device defined in claim 17 further comprising control circuitry configured to transmit the facial expressions to external equipment that displays an avatar with the facial expressions.

21. A head-mounted device, comprising:
   a display configured to display an image for viewing from eye boxes;
   a head-mounted housing, wherein the display is mounted in the head-mounted housing, the head-mounted housing has a structure and a light seal, the light seal has opposing first and second surfaces, and the second surface is coupled to the structure; and
   a facial sensor embedded in the light seal between the first and second surfaces, wherein a portion of the light seal is interposed between the facial sensor and the first surface.

* * * * *